Jan. 22, 1963 R. LEE 3,074,228
COMBINED INTERNAL COMBUSTION AND STEAM ENGINES
Filed Dec. 9, 1960
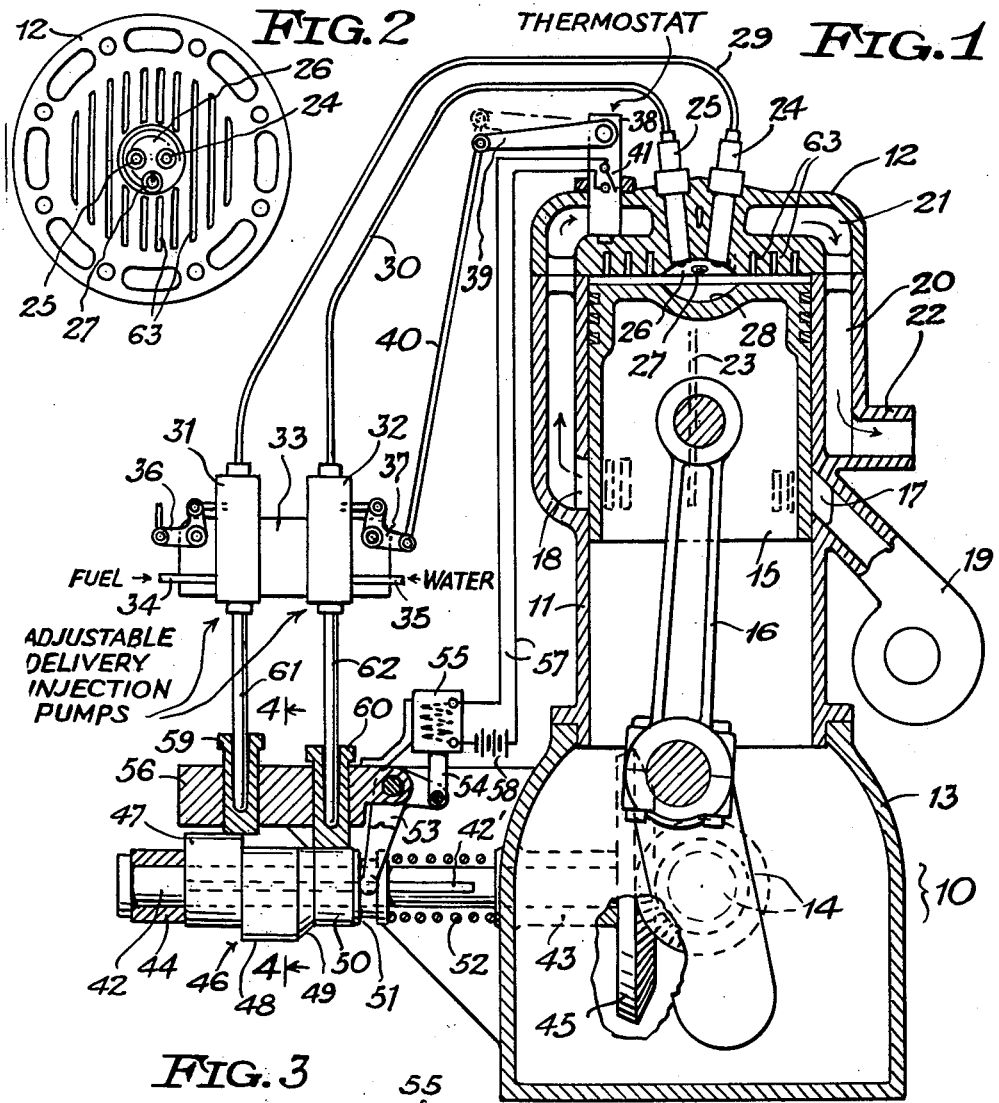
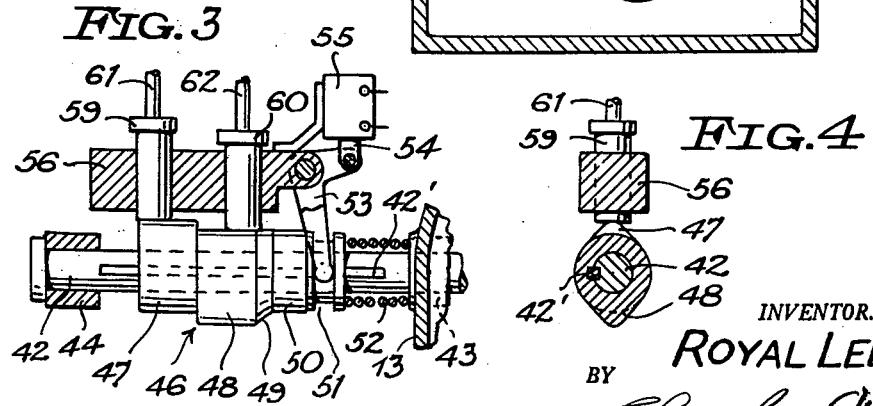
INVENTOR.
ROYAL LEE
BY Christopher L. Waal
ATTORNEY

United States Patent Office 3,074,228
Patented Jan. 22, 1963

3,074,228
COMBINED INTERNAL COMBUSTION AND STEAM ENGINES
Royal Lee, Box 267, Elm Grove, Wis.
Filed Dec. 9, 1960, Ser. No. 74,814
3 Claims. (Cl. 60—16)

This invention relates to engines and more particularly to combined internal combustion and steam engines of the general type in which water is injected to generate steam.

An object of the invention is to provide a combined internal combustion and steam engine having an improved operating cycle in which combustion power strokes and intervening steam power strokes are produced in the same working chamber or cylinder.

Another object is to provide a combined internal combustion and steam engine which starts as an internal combustion engine and is automatically converted to combined operation with water injection when the engine attains a predetermined operating temperature.

Still another object is to provide an engine in which the amount of water admitted to the engine cylinder for steam generation is thermostatically controlled.

A further object is to provide an engine having an improved form of combustion chamber for controlling the combustion process.

A still further object is to provide an improved engine cycle or method of operating the engine.

The invention further consists in the several features hereinafter described and claimed.

In the accompanying drawing:

FIG. 1 is a vertical sectional view of a combined internal combustion and steam engine arranged in accordance with the invention, the engine being shown in starting condition, and parts being shown schematically;

FIG. 2 is a bottom view of the cylinder head of the engine;

FIG. 3 is a fragmentary vertical sectional view of injector-operating cam mechanism of the engine as it appears when the engine is in normal operation, and FIG. 4 is a detail transverse sectional view of the cam mechanism, taken generally on the line 4—4 of FIG. 1.

In the drawing, the numeral 10 designates generally a mixed-cycle engine of the invention. By way of example the engine is shown to be of the single-cylinder type, although the invention is also applicable to multiple-cylinder engines. The engine comprises a cylinder 11 closed at one end by a cylinder head 12 and connected at the other end to a crank-case 13 in which a crank-shaft 14 is rotatably mounted. A piston 15 is reciprocable in the cylinder and is operatively connected to the crank-shaft by a connecting rod 16.

The cylinder is provided with opposite piston-controlled intake and exhaust valve ports 17 and 18, the intake ports 17 being connected to a source of scavenging and charging air such as a blower 19. In some instances, the cylinder is provided with a jacket 20 communicating with a cylinder head jacket 21 for receiving exhaust gases and spent steam discharged from the cylinder, one side of the cylinder jacket communicating with the cylinder exhaust port 18 and the other side having an exhaust pipe 22, and there being baffle means 23 within the cylinder jacket for diverting at least a large part of the exhaust from the exhaust ports through the cylinder head jacket.

The cylinder head is provided with a valved fuel injector or spray nozzle 24 and a valved water injector or spray nozzle 25, here shown to have their discharge ends at a concave recess 26 formed in the central part of the bottom of the cylinder head. The cylinder head is also provided with a spark plug 27. However, with sufficiently high compression in the cylinder, ignition may be effected by the heat of compression, as in a Diesel engine. The piston head is here shown to have a central recess 28.

The injectors or spray nozzles 24 and 25 are connected by tubes 29 and 30 to respective adjustable-delivery injection pumps 31 and 32 of any conventional type mounted on a suitable support 33 and operated as hereinafter described. The injection pumps are provided with respective inlets 34 and 35, and with respective delivery-controlling means 36 and 37. The delivery-controlling means 36 for the fuel injection pump 31 is actuated by the usual governing device or manual control, not shown, and the delivery-controlling means 37 for the water injection pump is actuated by a thermostat 38 mounted on the cylinder head and responsive to engine temperature. The thermostat includes a lever 39 connected to the delivery-controlling means 37 by a link 40, and also includes a normally open switch 41 for a purpose hereinafter described.

A cam-shaft 42 is journalled in spaced bearings 43 and 44 and is rotated at one-half crank-shaft speed by gearing 45. A cam assembly 46 is splined on the cam-shaft by a key 42' and comprises, in serial order, a single-lobed fuel injection cam 47, an adjacent similar water-injection cam 48 having its lobe spaced 180° from the lobe of the fuel-injection cam, a ramp collar 49, a cylindrical idler collar 50, and peripherally grooved shifting collar 51. The cam assembly is urged axially in one direction to a starting position, as seen in FIG. 1, by a coiled spring 52 surrounding the cam-shaft, and is urged in the other direction to a running position, as seen in FIG. 3, by a bell-crank lever 53 having an arm engaging the shifting collar 51 and another arm connected to the movable core 54 of an operating solenoid 55, the bell-crank and solenoid being mounted on a support 56 which is disposed above the cam-shaft. The solenoid is connected in a control circuit including conductors 57, a source of current 58, and the thermostatic switch 41.

A pair of tappets 59 and 60 are slidably mounted in the support 56 in the vertical plane of the cam shaft and ride on the cam assembly 46. Push rods 61 and 62 are seated in the respective tappets and actuate the respective injection pumps 31 and 32. In the starting position of the engine, as seen in FIG. 1, the tappet 59 rides on both cams 47 and 48, so as to actuate the fuel injection pump once for each revolution of the crank-shaft, and the tappet 60 rides on the cylindrical idler collar 50 and is not actuated. In the normal running position of the engine, the tappets 59 and 60 ride on the respective cams 47 and 48, as seen in FIG. 3, so as to effect alternate actuation of the fuel injection pump and water injection pump. In some instances, the cam 47 may be fixed on the cam-shaft in the position seen in FIG. 1, but will then engage only a part of the bottom face of the tappet 59 during normal operation of the engine.

For convenience in illustration the cam-shaft is shown to extend at right-angles to the crank-shaft, but these shafts could equally well be arranged in parallel relation.

While each injecting means is here shown to comprise an injection pump and an injector or spray nozzle, it will be understood that a unit or combined type of pump and injector of any well known type may be provided instead.

The metal cylinder head 12 is shown to be provided in its bottom portion with a number of narrow grooves or slot-like recesses 63 each of which is not wider than about ⅛ inch throughout its depth, so that no combustion will occur therein. The grooves are here shown to be straight and parallel but some or all of them could be concentric instead. The aggregate volume of the grooves is a substantial part of the clearance volume, for example, from 30 to 50% thereof. The purpose of these grooves is to control combustion so as to prevent detonation and high pressure peaks. This is particularly desirable in the case of an engine, especially a spark-ignition engine, having early admission of fuel to improve fuel mixing. In this case the air, or fuel mixture, contained in the grooves will not burn until it leaves the grooves after the piston commences its power stroke. While the grooves or recesses are preferably formed in the cylinder head they could be formed in the piston head instead.

The cylinder and piston therein define a working chamber which forms a combustion chamber, a gas expansion chamber, and a steam expansion chamber, and the piston forms a movable work member.

When the engine is started from cold, the injection apparatus is in the condition seen in FIG. 1, in which the fuel injector 24, 31 will operate once for each revolution of crank-shaft, and the water injector 25, 32 does not operate. The engine starts firing either by compression ignition or by spark ignition, and operates as a conventional two-stroke cycle engine, charging and scavenging air being supplied by the blower 19. The exhaust gases pass through the cylinder jacket 20 and head jacket 21 and pass out through the exhaust pipe 22. When the cylinder head attains a predetermined temperature sufficiently high to vaporize injected water, the thermostatic switch 41 closes, thus energizing the solenoid 55 so as to shift the rotating cam assembly 46 to the position shown in FIG. 3. When this occurs fuel injection and water injection are effected alternately so as to provide alternate combustion power and steam power strokes. The vaporization of the injected water to form the steam also provides a cooling effect to prevent the engine from attaining an excessivly high temperature. As the temperature of the cylinder head increases, incident to increase in engine load, the thermostat 38 also actuates the linkage 37, 39, 40 to increase the water delivery from the water injection pump 32, thus providing more steam for the steam power strokes and also increasing the cooling effect. When the engine is stopped, the thermostatic switch 41 opens after the cylinder head cools, thus deenergizing the solenoid 55, whereupon the spring 52 returns the splined cam assembly to starting position.

While the invention is shown to be embodied in an engine with a starting condition of the two-stroke cycle type, it is also applicable to a four-stroke cycle engine. In the normal running condition of the engine illustrated, the power combustion strokes alternate with the steam power strokes. However, by suitable modification of the cam mechanism other cycles may be provided. For example, a cycle may consist of one combustion power stroke followed by two steam power strokes, or two combustion power strokes followed by one steam power stroke. The invention may also be embodied in engines of different mechanical types, such as opposed piston engines and engines with mechanically operated valves.

I claim:

1. An engine comprising a cylinder, a piston reciprocable therein, a crank-shaft operatively connected to said piston, a cam-shaft drivingly connected to said crank-shaft, a fuel injection device, a water injection device, and first and second cams on said cam-shaft for actuating said respective fuel and water injection devices in time-spaced relation, said second cam being axially shiftable on said cam-shaft between first and second positions, thermostatically controlled means responsive to engine temperature for axially shifting said second cam from said first position to said second position when the engine temperature rises to a predetermined value and for axially shifting said second cam back to said first position when the engine temperature drops from said predetermined value, said second cam when in said first position being in actuating relation to said fuel injection device conjointly with said first cam and being out of actuating relation to said water injection device, and said second cam when in said second position being in actuating relation to said water injection device and being out of actuating relation to said fuel injection device.

2. A combined internal combustion and steam engine, comprising a working chamber having a reciprocable work member, fuel injection means for introducing fuel into said chamber to produce combustion power strokes, water injection means for introducing water into said chamber to produce steam power strokes, and rotatable cam means including first and second cams for actuating said respective fuel and water injection means in time-spaced relation, said second cam being axially shiftable between first and second positions, thermostatically controlled means responsive to engine temperature for axially shifting said second cam from said first position to said second position when the engine temperature rises to a predetermined value and for axially shifting said second cam back to said first position when the engine temperature drops from said predetermined value, said second cam when in said first position being in actuating relation to said fuel injection means conjointly with said first cam and being out of actuating relation to said water injection means, and said second cam when in said second position being in actuating relation to said water injection means and being out of actuating relation to said fuel injection means.

3. An engine comprising a cylinder, a piston reciprocable therein, a crank-shaft operatively connected to said piston, a cam-shaft drivingly connected to said crank-shaft, a fuel injection device, a water injection device, and first and second cams on said cam-shaft for actuating said respective fuel and water injection devices in time-spaced relation, said first and second cams being axially shiftable as a unit between first and second positions, thermostatically controlled means responsive to engine temperature for axially shifting said unit-forming first and second cams from said first position to said second position when the engine temperature rises to a predetermined value and for axially shifting said second cam back to said first position when the engine temperature drops from said predetermined value, said first cam when in either first or second position being in actuating relation to said fuel injection device, said second cam when in said first position being in actuating relation to said fuel injection device conjointly with but in time-spaced relation to said first cam and being out of actuating relation with respect to said water injection device, and said second cam when in said second position being in actuating relation to said water injection device and being out of actuating relation to said fuel injection device.

References Cited in the file of this patent
UNITED STATES PATENTS

| | | |
|---|---|---|
| 1,339,176 | Dyer | May 4, 1920 |
| 2,001,577 | Johnson | May 14, 1935 |
| 2,573,536 | Bodine | Oct. 30, 1951 |
| 2,671,311 | Rohrbach | Mar. 9, 1954 |